3,053,622
GRANULAR FERTILIZER

Louis E. Bostwick, Lakeland, Fla., assignor to International Minerals & Chemical Corporation, a corporation of New York
No Drawing. Filed May 5, 1958, Ser. No. 732,799
4 Claims. (Cl. 23—107)

This invention relates to the preparation of granular ammonium phosphate fertilizer. More particularly, this invention relates to an improved method of preparing granular ammonium phosphate fertilizer from concentrated phosphoric acid and ammonia-containing fluids.

Numerous processes have been developed for the preparation of ammonium phosphate by reacting phosphoric acid and ammonia-containing fluids. Generally these processes involve reacting phosphoric acid and ammonia in the presence of previously prepared ammonium phosphate particles, whereby the particle size is increased due to formation of ammonium phosphate on the surface of the particles. Since the reaction is exothermic, substantially all of the water originally present in the acid is evaporated, resulting in a substantially dry product. However in these processes, the particle size of the solids initially present in the ammoniator is not uniform, thereby resulting in a granular product of non-uniform particle size. In addition, ammoniation of the solids is difficult to control because of the lack of uniformity of particle size, and substantial losses of unreacted ammonia are usually incurred.

It is a primary object of the invention to overcome the disadvantages inherent in prior art methods of preparing ammonium phosphate from concentrated phosphoric acid and an ammonia-containing fluid.

It is a futher object of this invention to provide an improved method for preparing granular ammonium phosphate.

Another object is to provide an improved method of preparing granular ammonium phosphate wherein ammoniation is easily controlled.

Still another object is to provide a method of preparing granular ammonium phosphate wherein the particle size of the product is relatively uniform.

These and other objects of the invention will become apparent from the following detailed description of the invention.

An improved process has been discovered for the preparation of granular ammonium phosphate from concentrated phosphoric acid and an ammonia-containing fluid, wherein control of ammoniation and uniform particle size of the product is readily attained. In the novel process, discrete particles of previously prepared ammonium phosphate are admixed with concentrated phosphoric acid in a suitable mixing apparatus. Sufficient acid is admixed with the solids to impregnate the outer surfaces of the solids without substantial wetting thereof. The solids are then screened to separate a coarse fraction and a fine fraction. The fine fraction is recycled to the mixing apparatus. The coarse fraction is conveyed to a suitable reactor such as a rotary ammoniator, and reacted with an ammonia-containing fluid, the minimum amount of ammonia-containing fluid being equivalent to the proportion required to form monoammonium phosphate with substantially all of the free phosphoric acid present in the solids. Ammoniation of the solids produces granular ammonium phosphate solids of relatively uniform particle size, which are particularly suitable for use as a "direct application" fertilizer.

More in detail, phosphoric acid prepared by the conventional "furnace process" or "wet process" may be used in the novel process. The concentration of the acid should be between about 45% and about 55% $P_2O_5$ by weight and preferably between about 50 and about 54%. Phosphoric acid of the desired concentration may be prepared by evaporation of conventional "wet process" and/or "furnace" acid in a suitable apparatus such as an oil-fired submerged combustion evaporator.

Solid ammonium phosphate particles having a composition substantially equivalent to the desired product and having a particle size below or within the desired particle size range of the product are fed into a suitable mixing apparatus such as a pug mixer. For example, if a product having a particle size between about 6 and about 12 mesh is desired, the solid particles fed to the mixer should have a particle size smaller than about 6 mesh and preferably smaller than about 12 mesh. However, coarser or finer particles may be added, depending upon the desired size of the product, and the operating conditions.

Phosphoric acid of the above described concentration and discrete particles of ammonium phosphate are fed to the mixer simultaneously in proportions to provide a weight ratio of $P_2O_5$ in the acid to solid ammonium phosphate of between about 0.10:1 and about 0.20:1, and preferably between about 0.14:1 and about 0.18:1. The proportion of $P_2O_5$ in the acid to ammonium phosphate should not be above about 0.20:- since higher proportions of acid are not absorbed by the solid particles, and the resulting mixture becomes a pasty mass, thereby preventing complete and uniform ammoniation of the acid contained therein. If the weight ratio of $P_2O_5$ in the acid to ammonium phosphate is less than about 0.10:1, there is a relatively small amount of acid present in the solids to react with ammonia in the subsequent ammoniation step. As a result, there is a relatively small increase in the size of the particles due to formation of ammonium phosphate on the surface of the solids and a large recycle stream must be maintained. However, when phosphoric acid of the above defined acid concentration range is admixed with ammonium phosphate in the above described proportions, the resulting granules contain a sufficient amount of free phosphoric acid, but are substantially dry and easy to handle.

Phosphoric acid-impregnated ammonium phosphate particles discharged from the mixer are separated, as by screening, into a coarse fraction and a fine fraction. Preferably, the separation is made on a screen having a mesh size in the range between about 10 and about 14 mesh, but other size screens may be used if desired. Undersize particles comprising the fine fraction are recycled to the mixing step. Generally there are no oversize particles, but in the event that oversize particles are produced, they may be separated by screening, then comminuted, and recycled to the mixing step. Solids having the desired particle size, comprising the coarse fraction, are then fed to a suitable rotating ammoniator, for example, an ammoniator of the type described in U.S. Patent No. 2,741,545, issued April 10, 1956.

A bed of rolling discrete phosphoric acid-impregnated particles is established in the rotating ammoniator, each particle passing through the bed from the feed end of the drum to the discharge end of the drum in a substantially continuous curved path approximating a flattened helix of many turns.

An ammonia-containing fluid is introduced below the surface of the bed of rolling solids in the rotating ammoniator. Ammonia-containing fluids suitable for use in the instant process include anhydrous ammonia, either in liquid or gaseous form, concentrated aqueous ammonia solutions, aqueous nitrate solutions containing free ammonia, and mixtures thereof. An example of an aqueous nitrate solution containing free ammonia is the commercial solution known as Barrett's Solution No. 6. A typical chemical analysis of this solution is as follows:

| Component: | Proportion, percent |
|---|---|
| Ammonium nitrate | 60 |
| Ammonia (dry basis) | 34 |
| Water | 6 |
| Total nitrogen | 49 |
| Nitrate nitrogen | 10.5 |
| Ammonium nitrogen | 34.5 |

The minimum amount of ammonia-containing fluid fed to the ammoniator is the amount required to form monoammonium phosphate with the free phosphoric acid present in the solids. Generally, ammonia-containing fluid is added to the ammoniator in an amount equivalent to a molar ratio of nitrogen added as ammonia to $P_2O_5$ added as phosphoric acid of between about 2:1 and about 4:1, and preferably between about 2.3:1 and about 3.7:1. If the nitrogen to $P_2O_5$ ratio is below about 2:1, the product may contain free acid, and if the ratio is above about 4:1, ammonia may be lost by volatilization. Solids are retained in the ammoniator in contact with the ammonia-containing fluid for between about 10 and about 40 minutes.

In order to minimize or avoid loss of ammonia by volatilization in the ammoniator, the average temperature of the solids during ammoniation should be maintained below about 210° F. and preferably not above about 190° F. The temperature of the solids may be controlled during ammoniation by the use of liquid anhydrous ammonia, aqueous ammonia solutions, aqueous nitrate solutions containing free ammonia, either individually, admixed with each other, or admixed with gaseous anhydrous ammonia. The temperature of the solids in the ammoniator may also be controlled by spraying water on the bed of solids. In this embodiment, a suitable water line may be positioned in the ammoniator above the bed of solids, the line being adapted to spray water in finely divided droplet form onto the surface of the bed of rolling solids. The water spray not only maintains the temperature within the desired range, but also aids in completing the reaction between the acid and ammonia-containing fluid. The temperature of the solids in the ammoniator may also be effectively controlled by means of a suitable blower adapted to force air through the drum over the bed of solids contained therein.

Because of the relatively uniform size of the solids fed to the ammoniator, control of ammoniation of the solids is easily accomplished. Each granule is ammoniated to substantially the same degree in the ammoniator, thereby producing granules of substantially uniform size and of substantially the same degree of ammoniation.

Solids discharged from the ammoniator are generally relatively dry, since the reaction between ammonia and phosphoric acid is exothermic, and the heat generated thereby is generally sufficient to evaporate substantially all of the water when concentrated phosphoric acid and anhydrous ammonia are used. However, when aqueous ammonia solutions are used, the product may contain an excessive amount of moisture. In this event, the granules may be heated to substantial dryness in a suitable drying apparatus such as a rotating dryer. The temperature of the solids in the dryer should be maintained between about 180 and 195° F. in order to dry the solids without volatilization of a significant amount of ammonia.

Substantially all of the solids discharged from the ammoniator or dryer, as the case may be, are within the desired size range, and further size separation by screening or the like is generally not necessary. The resulting granules of ammonium phosphate are suitable for use as a fertilizer ingredient. Granules produced in accordance with the novel process may be applied directly to the soil, or used as an ingredient of mixed fertilizers.

The following example is presented to further illustrate the invention without any intention to be limited thereby. All parts and percentages are by weight unless otherwise specified.

*Example*

Ammonium phosphate (18% N, 48% $P_2O_5$), all of which passed through a 20 mesh screen was admixed in a planetary type mixer with phosphoric acid (54% $P_2O_5$). Solids were discharged from the mixer onto a 14 mesh screen. Undersize solids from the screen were recycled to the mixer and admixed with additional ammonium phosphate and phosphoric acid. A total of 1600 grams of ammonium phosphate and 480 grams of phosphoric acid were added to the mixer.

Oversize solids retained by the screen were conveyed to a rotary ammoniator comprised of a cylinder 11″ long by 13½″ in diameter, having a 6½″ diameter hole in one end, and closed at the opposite end. The closed end was secured at the axis to a motor driven horizontal shaft. The ammoniator was rotated at about 30 revolutions per minute, which was equivalent to a 5½′ diameter drum rotating at about 6 revolutions per minute. Anhydrous ammonia was fed below the surface of the bed of solids in the ammoniator through a pipe having a slotted opening positioned parallel to the longitudinal axis of the drum. Anhydrous ammonia (8.41 cubic feet) was fed to the solids in the drum at the average rate of about 0.31 cubic feet per minute for 27 minutes. Water (47 grams) was sprayed on top of the bed of solids by means of an atomizer during this period. The maximum average temperature of the solids in the ammoniator was about 125° F. Solids discharged from the ammoniator contained 48.3% $P_2O_5$ and 17% nitrogen as ammonia. The granules were hard and dry, and were particularly suitable for use as a "direct application" fertilizer. Substantially all of the granules were between about 6 and about 14 mesh.

Having now thus fully described the invention, what is desired to be secured by Letters Patent is:

1. In a process for the preparation of granular ammonium phosphate of substantially uniform particle size from concentrated phosphoric acid and an ammonia-containing fluid, the steps which comprise admixing discrete particles of ammonium phosphate of a particle size not larger than the desired product with phosphoric acid having a $P_2O_5$ concentration between about 45 and about 55% by weight, the weight ratio of $P_2O_5$ in said phosphoric acid to said ammonium phosphate particles being about 0.10:1 and about 0.20:1, whereby substantially dry particles impregnated with said acid are obtained, separating the impregnated particles into a coarse fraction and a fine fraction, the coarse fraction approximating the particle size of the desired product and the fine fraction being smaller, recycling the fine fraction to the mixing operation, and, in a rolling bed, ammoniating the coarse fraction with an ammonia-containing fluid in an amount at least sufficient to form monoammonium phosphate from substantially all of the free phosphoric acid contained in said coarse fraction, whereby a granular ammonium phosphate product is obtained having the desired substantially uniform particle size.

2. A process as in claim 1 wherein said phosphoric acid has a $P_2O_5$ concentration between about 50 and about 54% by weight.

3. In a process for the preparation of granular ammonium phosphate of substantially uniform particle size from concentrated phosphoric acid and an ammonia-containing fluid, the steps which comprise admixing discrete particles of ammonium phosphate of a particle size not larger than the desired product with phosphoric acid having a $P_2O_5$ concentration between about 50 and about 54% by weight, the weight ratio of $P_2O_5$ in said phosphoric acid to said ammonium phosphate particles being about 0.14:1 and about 0.18:1, whereby substantially dry particles impregnated with said acid are obtained, separating the impregnated particles into a coarse fraction and a fine fraction, the coarse fraction approximating the particle size of the desired product and the fine fraction being smaller, recycling the fine fraction to the mixing operation, and, in a rolling bed, ammoniating the coarse fraction with an ammonia-containing fluid in an amount at least sufficient to form monoammonium phosphate from substantially all of the free phosphoric acid contained in said coarse fraction, whereby a granular ammonium phosphate product is obtained having the desired substantially uniform particle size.

4. In a process for the preparation of granular ammonium phosphate of substantially uniform particle size in the range of about 6 to about 14 mesh from concentrated phosphoric acid and an ammonia-containing fluid, the steps which comprise admixing −20 mesh ammonium phosphate particles in a planetary type mixer with concentrated phosphoric acid of about 54% $P_2O_5$ content, the weight ratio of said phosphoric acid to ammonium phosphate being about 0.3:1, screening the resulting dry, impregnated particles and obtaining a +14 mesh fraction and a −14 mesh fraction, recycling the −14 mesh fraction to the mixing operation, and reacting the +14 mesh fraction with ammonia in the presence of water in a rotary ammoniator at an average temperature not exceeding about 125° F. to produce a reaction product having a nitrogen to $P_2O_5$ ratio around 0.35:1, whereby hard, dry granules of ammonium phosphate are obtained having a particle size between about 6 and about 14 mesh.

References Cited in the file of this patent
UNITED STATES PATENTS

| | | |
|---|---|---|
| 2,598,658 | Procter et al. | May 27, 1952 |
| 2,600,253 | Lutz | June 10, 1952 |
| 2,680,680 | Coleman | June 8, 1954 |
| 2,729,554 | Nielsson | Jan. 3, 1956 |
| 2,945,754 | Hignett et al. | July 19, 1960 |

UNITED STATES PATENT OFFICE
CERTIFICATE OF CORRECTION

Patent No. 3,053,622                         September 11, 1962

Louis E. Bostwick

It is hereby certified that error appears in the above numbered patent requiring correction and that the said Letters Patent should read as corrected below.

Column 2, line 24, for "0.20:-" read -- 0.20:1 --.

Signed and sealed this 28th day of May 1963.

(SEAL)
Attest:

ERNEST W. SWIDER                      DAVID L. LADD
Attesting Officer                          Commissioner of Patents